Feb. 17, 1948. L. C. ANTLES 2,435,951
METHOD OF AND MEANS FOR POLLINATING BLOSSOMS
Filed July 5, 1944
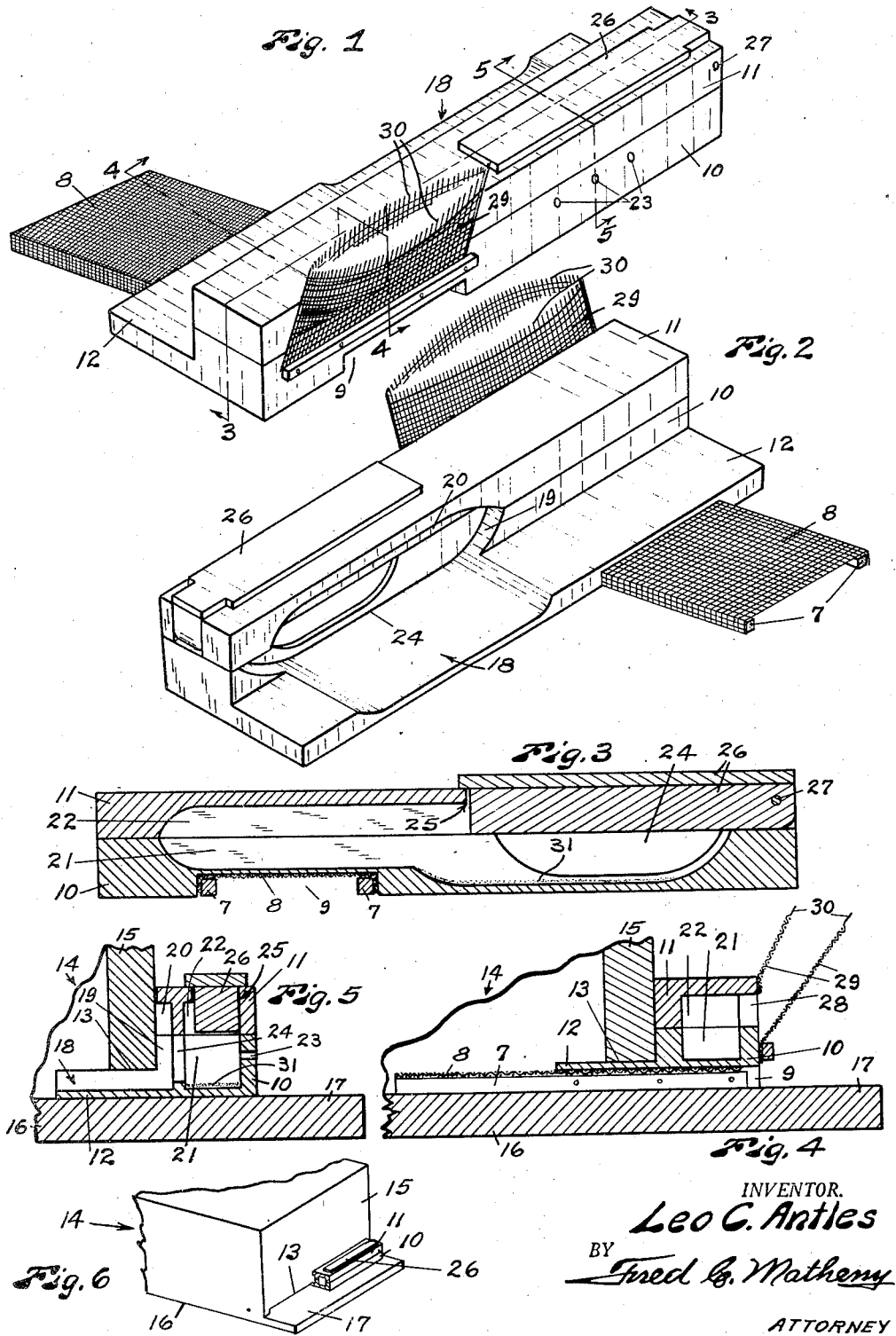
INVENTOR.
Leo C. Antles
BY
Fred C. Matheny
ATTORNEY Patented Feb. 17, 1948

2,435,951

UNITED STATES PATENT OFFICE 2,435,951

METHOD OF AND MEANS FOR POLLINATING BLOSSOMS

Leo C. Antles, Wenatchee, Wash.

Application July 5, 1944, Serial No. 543,587

11 Claims. (Cl. 6—4)

This invention relates to plant blossom pollination and an object of this invention is to provide an improved method of and means for pollinating the blossoms of plants, such as fruit bearing trees, by the controlled activities of honey bees.

In accordance with my method of pollination I gather the fertile pollen needed by the blossoms that are to be pollinated and I control the activities of honey bees hived in the usual manner and located near the blossoms that need the pollen service to such an extent that these honey bees are brought into contact with this pollen and are caused to pick up some of said pollen each time they visit the hive and are further caused to carry away with them some of this pollen which they distribute to the blossoms that need the pollen service.

It is therefore an object of this invention to control the activities of honey bees in such a manner that the bees are caused to pick up fertile pollen at a bee hive and carry this pollen to blossoms needing the pollen service.

Another object of the invention is to provide, in connection with a beehive, means for receiving a supply of fertile pollen and maintaining this pollen in such a manner that bees visiting the beehive are caused to come in contact with the pollen and will pick up some of the pollen and carry it to the blossoms in which they work.

Another object of this invention is to provide, in bee control devices of this nature, means tending to promote or encourage immediate flight of the bees away from the hive after they have picked up the pollen thereby reducing to a minimum the possibility of the bees divesting themselves of such pollen before leaving the beehive.

This method of pollination through the controlled activities of honey bees has been proven to be particularly well adapted to the pollination of the blossoms of self-sterile apple trees by the use of inter-fertile pollen and is equally well adapted for the pollination of the blossoms of any and all other plants from which fertile pollen for use at the hive can be gathered or obtained.

Other objects of my invention will be apparent from the following description taken in connection with the accompanying drawings.

In the drawings:

Figure 1 is a detached isometric view showing one type of beehive insert device that may be used in carrying out this invention and looking at the device from the side which is outermost or toward the observer when the device is installed in a beehive.

Fig. 2 is a detached isometric view similar to Fig. 1 but showing the side of the device that is positioned next to the beehive when the insert is in use.

Fig. 3 is a view in longitudinal section taken substantially on broken line 3—3 of Fig. 1.

Figs. 4 and 5 are two views in cross section taken substantially on broken lines 4—4 and 5—5 of Fig. 1 respectively and showing this beehive insert device as it may appear when installed in a beehive, a fragment only of the beehive being shown.

Fig. 6 is a fragmentary view on a smaller scale than the other figures, showing the front portion of a beehive with my insert installed therein, a portion of the insert being broken away.

Like reference numerals designate like parts throughout the several views.

The beehive insert shown in the drawings comprises a relatively long box-shaped member preferably made up of a bottom piece 10 and a top piece 11 secured together by any suitable means in face to face relation.

The bottom piece 10 has an extension member 12 formed on the front side thereof flush with the bottom. The extension member 12 is of less thickness than the bottom member 10 and is preferably thin enough so that it can be inserted into the opening 13 through which the bees ordinarily enter end leave a conventional beehive 14. Such an opening 13 is shown in Figs. 4, 5 and 6 with the insert installed therein. Also these figures show the front end wall 15, bottom 16 and alighting platform 17 of the beehive. The inner side of the box shaped portion of the insert is positioned against the front wall 15 of the beehive when the insert is in use.

As an inlet passageway through which bees can enter the hive from the alighting platform 17 I provide a relatively wide groove or channel 9 that extends across the lowermost side of the bottom piece 10 adjacent one end thereof. This bee inlet passageway 9 has an inwardly directed extension 8 of inverted channel shape, preferably formed of wire netting supported by splints 7, and extending far enough into the beehive so that bees entering the hive will be in substantial darkness when they emerge from the inner end portion of this extension 8.

As an outlet or exit means for the bees the extension member 12 has a relatively wide transverse groove or channel 18 extending across its top surface near the end of the insert remote from the bee entrance 9. The groove or channel 18 provides clearance so that the bees can pass under the bottom edge of the front wall 15 of the hive when the insert is in operative position, see Fig. 5.

The inner edge portion of the bottom piece 10 directly above the transverse groove 18 is cut away to form a recess 19 that provides a passageway, see Fig. 5, between the external surface of the front wall 15 of the hive and the member 10 when the insert is in an operative position. The inner edge portion of the top piece 11 may have a recess 20 that is similar to the recess 19 in the bottom piece 10 and registers with said recess 19.

The contacting faces of the two pieces 10 and 11 are provided respectively with grooves 21 and 22 that cooperate to form a pollen receptacle or chamber adapted to receive pollen, indicated by numeral 31. The bees must pass through this pollen in leaving the hive.

One or more small light inlet openings 23 are provided in the outer wall of the piece 10 opposite the grooves 18 and recess 19. A portion 24 of the wall opposite the light inlet openings 23 is cut away, see Figs. 2 and 5, to provide ample room for the bees to enter the pollen chamber formed by grooves 21 and 22.

An opening 25 is provided in the top wall of the member 10 for the admission of the pollen 31 and a door member 26 hinged on a pivot 27 is adapted to close the doorway or opening 25. The door 26, when closed, prevents the entrance of light from the top so that substantially all light that enters this part of the pollen chamber must enter through the light inlet openings 23.

The pollen chamber 21—22 has an exit opening 28, Fig. 4, offset longitudinally of the insert relative to the light inlet openings 23 and relative to the opening 24 through which the bees enter the pollen chamber. This makes it necessary for the bees to travel lengthwise of the pollen chamber 21—22 through the pollen 31 to reach the exit opening 28. Also it provides an arrangement of parts which prevents the light which enters this exit opening 28 from passing directly to the opening 24.

A tunnel 29 formed of woven wire netting, such as the type of wire netting ordinarily used for window screens, registers with the exit opening 28 and extends in a generally upward direction to a location a substantial distance above the top insert member 11 and terminates in spaced apart small wires or spines 30 which are not comfortable for the bees to rest on and tend to prevent the bees from preening and thus shaking or brushing off the pollen which they have picked up before starting their flight. These spines 30 may be easily provided in the netting by stripping out a few of the uppermost horizontal wires thus leaving the end portions of the upright wires to form the spines. It has been found in practice that if the spines 30 are at least three fourths of an inch above the top of the insert member 11 and at least that far away from all other convenient resting places for the bees then the bees will fly away as soon as they reach the upper end portion of the tunnel 29.

In the use of this beehive insert the insert is applied to the hive by inserting the extension member 12 into the bee inlet and outlet slot at the front of the hive and positioning the inner faces of the members 10 and 11 snugly against the front wall of the hive. The insert is long enough to reach substantially from end to end of the hive entranceway 13. One way to secure the insert to the beehive is to introduce, between the side walls of the hive and one or both ends of the insert, wedges of suitable shape and size to hold the insert and close any openings that might otherwise be left at these locations.

Fertile pollen 31, suitable for pollination of blossoms in the vicinity of the beehive, is placed in the bottom of the pollen chamber 21—22. When the insert is installed as above described the bees alighting on the board 17 will enter by way of the bee inlet passageway 9 and screened tunnel 8. The inner end portion of the tunnel 8 is positioned far enough inside of the beehive to be in substantial darkness and the bees will be attracted by the small amount of light entering through the light inlet openings 23 and will leave the hive by the path formed by openings 18, 19 and 24 and the pollen chamber 21—22 and opening 28 and tunnel 29. This will make it necessary for the bees to travel through the pollen 31 to reach the exit and the spines 30 are not comfortable for the bees to pause on so the bees will be encouraged to take off without delay and without preening off the pollen that they have picked up in the pollen chamber.

The foregoing description clearly sets forth my method and one means for putting the same into operation but it will be understood that the method and the means for carrying out this method may be substantially changed without departing from the scope and spirit of the following claims.

I claim:

1. The method of pollinating blossoms of plants through the controlled activities of bees, which comprises locating a beehive in the vicinity of the blossoms; providing at the beehive pollen suitable for pollination of the blossoms; and directing the bees into contact with the pollen when they visit the hive.

2. The method of pollinating blossoms of plants through the controlled activities of bees, which comprises locating a beehive in the vicinity of said blosssoms; establishing for the bees a path of exit from the beehive separate from their path of entrance to said beehive; and providing in said path of exit pollen suitable for pollination of the blossoms to be picked up by the bees and carried to the blossoms.

3. The method of pollinating blossoms of plants through the controlled activities of bees, which comprises providing a hive of bees in the vicinity of the blossoms; providing at the beehive pollen suitable for pollination of the blossoms; directing the bees into contact with the pollen when they visit the hive; and establishing bee preening preventatives at the location of exit of the bees from the hive to insure immediate bee flight after contact with the pollen.

4. The method of pollinating blossoms of plants through the controlled activities of bees using a beehive located in the vicinity of the blossoms, which comprises establishing for the bees a path of entrance to the beehive which guides the bees into a dark portion of the beehive; establishing for the bees a separate dimly lighted path of exit which attracts the bees seeking to leave the beehive; and providing in said path of exit pollen suitable for pollination of the blossoms to be picked up by the bees and carried to the blossoms.

5. In the pollination of tree blossoms through the activities of honey bees, the method of increasing the pollination activities of the bees which comprises establishing a pollen chamber in connection with the beehive with the chamber in open communication with the travel path of a bee within the hive between the path entrance and exit to thereby provide the possibility of bulk pollination of the bee within the hive; providing in the chamber pollen suitable for pollination of the blossoms, and controlling the exit activities of the bee by establishing bee preening preventatives at such path exit to thereby cause the pollen-laden bee to assume service flight immediately when leaving the hive.

6. Means for increasing the pollination activities of bees using a beehive located in the vicinity of blossoms to be pollinated, comprising a beehive insert, adapted to control the entrance and exit of bees relative to a beehive; a pollen chamber in said insert through which bees entering and leaving said beehive must pass; and pollen in said pollen chamber suitable for pollination of said blossoms.

7. Means for increasing the pollination activities of bees using a beehive located in the vicinity of blossoms to be pollinated, comprising a beehive insert adapted to block the usual doorway to the beehive; an entrance opening in said insert for the bees; a separate bee exit opening in said insert; a pollen chamber in said insert through which the bees must pass to reach said exit opening; and pollen in said pollen chamber suitable for pollination of said blossoms.

8. Means for increasing the pollination activities of bees using a beehive located in the vicinity of blossoms to be pollinated, comprising a beehive insert adapted to block the usual doorway to the beehive; a bee entrance opening in said insert; means forming a bee conduit tunnel communicating with said bee entrance opening and extending to a substantial distance into the hive to deliver bees entering the hive into a relatively dark portion of the hive; a separate bee exit opening in said insert; a pollen chamber in said insert through which the bees pass to reach said bee exit opening; pollen in said pollen chamber suitable for pollination of said blossoms; and a light inlet passageway admitting a small amount of light into said pollen chamber to attract the bees into said pollen chamber.

9. Means for increasing the pollination activities of bees using a beehive located in the vicinity of blossoms to be pollinated, comprising a beehive insert adapted to control the entrance and exit of bees relative to a beehive and having a separate bee entrance and bee exit, a pollen chamber between said bee entrance and bee exit through which bees leaving said beehive are caused to travel; and bee preening preventative means associated with said bee exit to encourage prompt flight of the bees upon reaching said bee exit.

10. Means for increasing the pollination activities of bees using a beehive located in the vicinity of blossoms to be pollinated, comprising a beehive insert adapted to control the usual doorway to the beehive; a bee entrance opening in said insert, means forming a bee conduit tunnel communicating with said bee entrance opening and extending to a substantial distance into the hive to deliver bees entering through said bee entrance opening into a relatively dark portion of the hive; a separate bee exit opening in said insert; a pollen chamber in said insert through which bees must pass to reach said bee exit opening, said pollen chamber being adapted to receive pollen suitable for pollination of said blossoms; a light inlet passageway admitting a small amount of light into said pollen chamber to attract the bees that are seeking to leave the hive into said pollen chamber; and bee preening preventative means associated with said bee exit to stimulate immediate flight of the bees upon reaching said exit and before they have had an opportunity to divest themselves of the pollen picked up in said pollen chamber.

11. Means for increasing the pollination activities of bees using a beehive located in the vicinity of blossoms to be pollinated, comprising a beehive insert adapted to control the entrance and exit of bees relative to said beehive, said insert having a separate bee entrance and bee exit; a pollen chamber leading to said bee exit through which bees must pass to reach said bee exit; and a bee outlet tunnel of wire netting registering with said bee exit and extending upwardly therefrom and terminating in upwardly directed spaced apart spines of small diameter which tend to encourage prompt flight of the bees as they emerge from said outlet tunnel.

LEO C. ANTLES.

REFERENCES CITED

The following references are of record in the file of this patent:

UNITED STATES PATENTS

| Number | Name | Date |
| --- | --- | --- |
| 1,064,779 | Schamu | June 17, 1913 |
| 2,025,908 | Schlegel | Dec. 31, 1935 |
| 1,816,631 | Brown | July 28, 1931 |